UNITED STATES PATENT OFFICE.

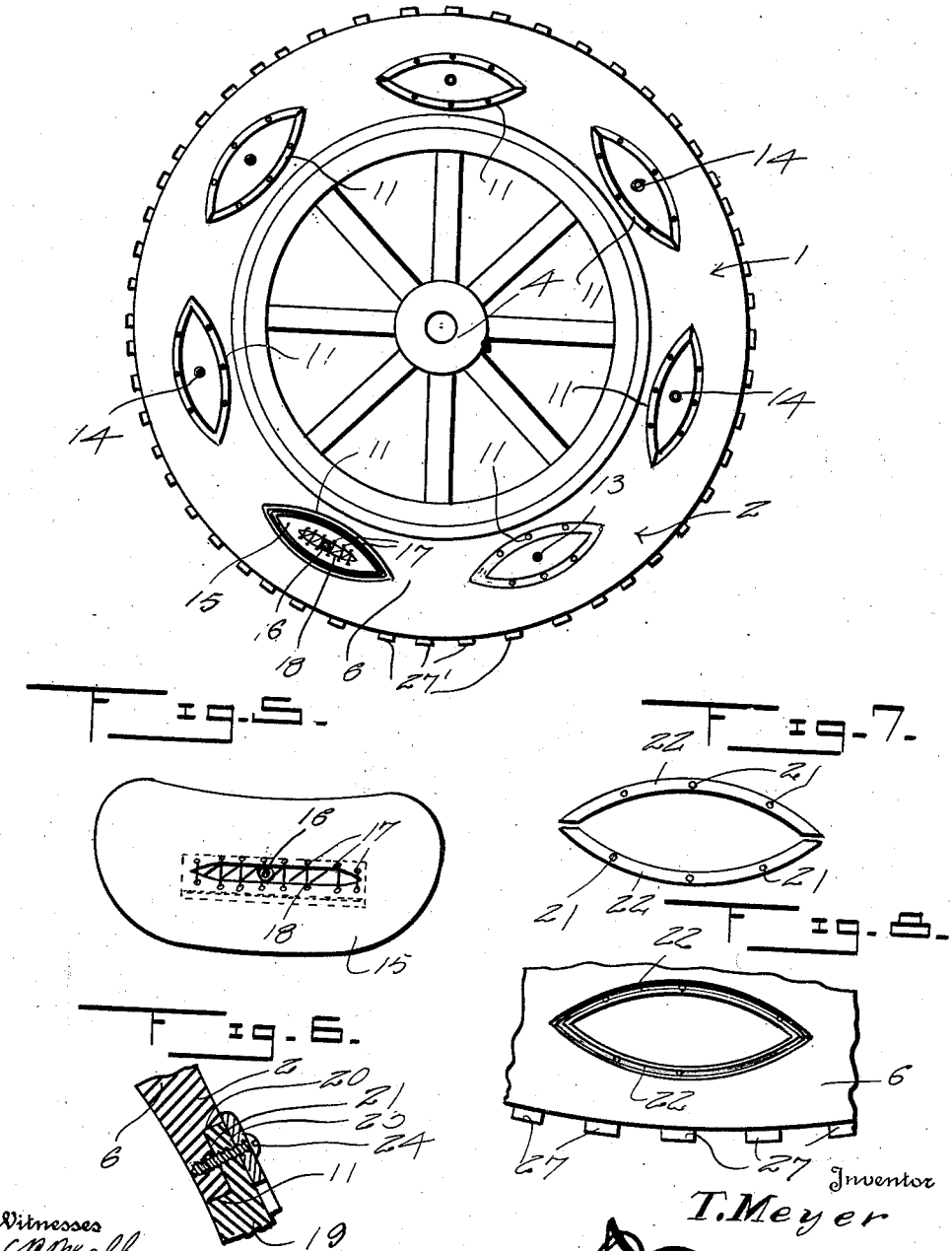
T. MEYER.
AUTOMOBILE TIRE.
APPLICATION FILED JAN. 24, 1918.
1,341,380.
Patented May 25, 1920.
2 SHEETS—SHEET 1.

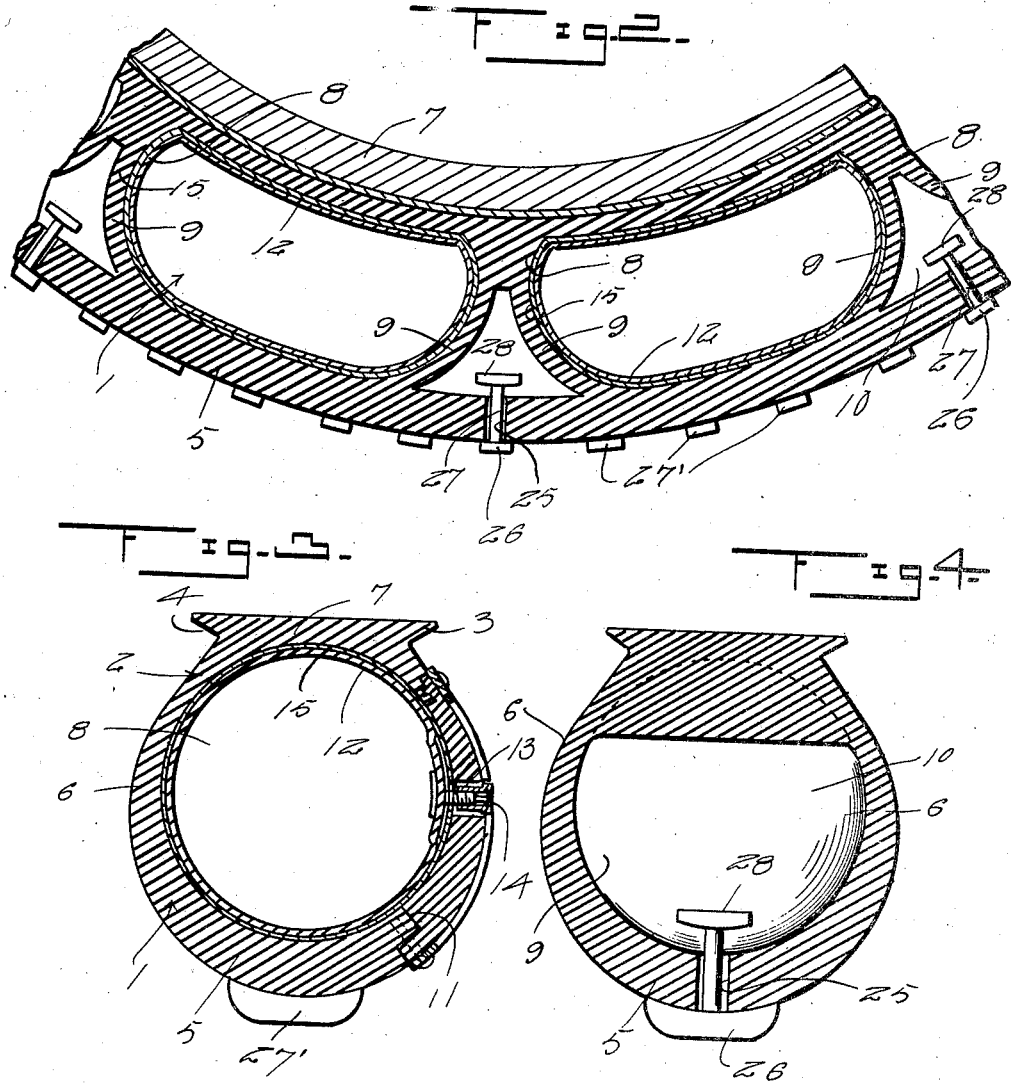

THEODORE MEYER, OF BIRMINGHAM, ALABAMA, ASSIGNOR OF ONE-HALF TO WILLIAM AMOTT, OF SALT LAKE CITY, UTAH.

AUTOMOBILE-TIRE.

1,341,380.　　　　　Specification of Letters Patent.　　Patented May 25, 1920.

Application filed January 24, 1918. Serial No. 213,572.

*To all whom it may concern:*

Be it known that I, THEODORE MEYER, a citizen of the United States, residing at Birmingham, in the county of Jefferson and State of Alabama, have invented certain new and useful Improvements in Automobile-Tires; and I do hereby declare the following to be a full, clear, and exact description of the invention, such as will enable others skilled in the art to which it appertains to make and use the same.

This invention relates to pneumatic tires for automobiles and the like, and the primary object of the invention is to provide a tire having a plurality of independent inflatable air cells, so that if the tire becomes punctured in any one place, only one air cell will be deflated thus leaving the tire with sufficient air to support the weight of the vehicle, which will eliminate the inconveniences usually associated with flat tires.

Another object of the invention is the provision of a plurality of separate compartments in the tire casing, each compartment having a separate opening for receiving the air cell or inner tube, each of the air cells or inner tubes having a separate air valve for controlling the air into and out of the tube.

A further object of the invention is the provision of a tire of the above character in which each of the air cells or air tubes are provided with a separate protecting cover, said cover being readily removable from the tubes.

A still further object of the invention is the provision of pockets arranged between the air cell compartments, each pocket having a check valve therein for closing the opening in the pocket when the outer surface of the same engages the ground, so as to provide additional air support for the vehicle.

A still further object of the invention is the provision of a pneumatic tire of the above character, which is durable and efficient in use, one that is simple, and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:—

Figure 1 is an elevation of the improved tire on a vehicle wheel.

Fig. 2 is a fragmentary longitudinal vertical section through the improved tire.

Fig. 3 is a transverse section taken through the tire showing the air cell compartments.

Fig. 4 is a transverse section through one of the air pockets.

Fig. 5 is a side elevation of one of the air cells or inner tubes showing the protecting casing.

Fig. 6 is a fragmentary sectional view through a portion of the tire casing showing the joint between the removable section of the tire casing and the casing.

Fig. 7 is a detail view of the metallic strip for the closure, and

Fig. 8 is a fragmentary side elevation of the tire casing showing the metallic strip in position.

Referring to the drawings in detail, wherein similar reference numerals designate corresponding parts, throughout the several views, the numeral 1 generally indicates the improved pneumatic tire which includes the casing 2 having the ordinary clencher beads 3 for fastening the same to the vehicle wheel 4. The casing 2 includes the tread section 5, the side walls 6 and the connecting inner wall 7. The tire casing 2 is divided into a plurality of compartments 8 by forming arched partition walls 9, which extend across the side walls 6 and from the inner surface of the tread to the inner connecting wall 7, where the partitions are converged and formed together. The space between the partitions 9 forming the compartments 8 form pockets 10, the purpose of which will hereinafter more fully appear. The outer side wall 6 of the casing 2 is provided with oval shaped openings 11 which are in alinement with the compartments 8 and form means of access to the compartments, whereby the air cells 12 may be readily removed from and placed in the compartments, when so desired. Each air cell 12 is formed of rubber and made to conform to the shape of the compartment, and each of the same is provided with an ordinary type of air valve 13, whereby the same can be readily inflated and the valve is provided with the protecting cap 14. A removable protecting cover 15 is provided for each air cell and this covering is preferably formed of canvas and the like, and is formed similar to the ordinary protecting covers of foot balls and the like, and is formed with an opening 16 in its side for the entrance of the rubber tube, and the side walls of the opening are provided with eyelets 17, whereby the same can be laced with a cord 18. The valve 16 protrudes out of this protecting casing.

Each of the openings 11 is provided with a closure 19 made from the same material as the tire casing and this closure is made so as to conform to the configuration of the openings. The wall of the opening around the upper edge of the same is provided with a cut out portion 20 which receives the flange 21 formed on the closure 19 and a metallic strip 22 extends entirely around the meeting edges of the closure and the walls of the openings and forms a protecting plate for the same. This metallic strip 22 is preferably formed of two sections so as not to impair the elasticity of the tire. The sections, if so desired may be hinged together. The metallic strip 22 and the flange 21 of the closure 19, and the tire casing is provided with registering openings 23 and these openings receive the removable fastening elements 24, whereby the closures are held in position.

The pockets 10 formed by the spaced partition walls 9 between the compartments 8 are provided with openings 25 which extend through the periphery of the tire casing and these openings are provided with plugs 26 which can be formed similar to the corrugated tread knobs 27 formed on the tread of the tire 5. These plugs 26 are formed with a reduced shank 27 which extend entirely through the openings and the inner ends of the shank are provided with retaining plates 28. Thus, when the plugs 26 engage the ground the same will be forced against the wall of the opening 25 and close the opening and thus making an air tight pocket which will form an additional means for supporting the vehicle.

The advantage of having the valves or closure elements 26 is for the following purpose. When one of the valves or closure elements 26 is in engagement with the ground, it closes the opening 25 in the respective pocket and confines the air therein, rendering an additional cushion to the tire over that received by the tubes in the compartment. When the valve or closure element 27 is in closed position by contacting with the ground, the weight of the load is also on the adjacent ends of the adjacent tubes to the respective pockets compressing them and causing them to move radially away from said respective pocket and compresses the walls of the next pockets, and as their respective openings are open, the air therein can be readily expelled, permitting the walls of the last named pockets to move readily giving or flexing under the influence of the movement of the adjacent tubes.

From the foregoing description, it can be seen that an improved pneumatic tire is provided which is provided with a plurality of inflatable cells, so that if one of the cells become punctured, the other cells will effectively support the vehicle and thus prevent the tire from becoming flat and ruining the same.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to within the scope of the claims when required without sacrificing any of the advantages of my invention as set forth.

What I claim as new is:—

1. A pneumatic tire comprising a casing, a plurality of partitions in the casing to form a plurality of compartments, an air cell positioned in each compartment, means for inflating the air cells, an air pocket formed in each partition, and means for controlling the flow of air into and out of the air pockets, as and for the purpose specified.

2. A pneumatic tire comprising a casing, a plurality of partitions in the casing to form a plurality of compartments, an air cell removably fitted in each compartment, means for inflating the air cells, an air pocket formed in each partition, and valves carried by the pockets for controlling the flow of air into and out of the pockets and operated by the weight of the tire.

In testimony whereof I affix my signature in presence of two witnesses.

THEODORE MEYER.

Witnesses:
  L. G. WOODSON,
  D. C. BALL.